United States Patent
Xu

(10) Patent No.: US 9,553,513 B2
(45) Date of Patent: Jan. 24, 2017

(54) CONTROL CIRCUIT WITH CHOPPING AMPLIFIER FOR SWITCHING CONVERTER

(71) Applicant: Chengdu Monolithic Power Systems Co., Ltd., Chengdu (CN)

(72) Inventor: Li Xu, Chengdu (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 0 days.

(21) Appl. No.: 14/797,071

(22) Filed: Jul. 10, 2015

(65) Prior Publication Data

US 2016/0011613 A1   Jan. 14, 2016

(30) Foreign Application Priority Data

Jul. 11, 2014 (CN) .......................... 2014 1 0330826

(51) Int. Cl.
  *H02M 3/156* (2006.01)
(52) U.S. Cl.
  CPC .................... *H02M 3/156* (2013.01)
(58) Field of Classification Search
  CPC ...... H02M 3/156; H02M 3/157; H02M 3/158; H02M 3/1582; H02M 3/1584; H02M 3/155; H02M 3/335; H02M 3/33507; H02M 3/33515; H02M 3/337; H02M 2001/003; H02M 2001/0006; G01K 1/14
  See application file for complete search history.

(56) References Cited

U.S. PATENT DOCUMENTS

| | | | | |
|---|---|---|---|---|
| 7,262,654 | B2 * | 8/2007 | Kejariwal | H03F 3/387 330/51 |
| 7,307,390 | B2 * | 12/2007 | Huynh | H02M 3/33507 315/209 R |
| 8,570,008 | B2 * | 10/2013 | Lawson | H02M 3/156 323/225 |
| 8,928,300 | B2 | 1/2015 | Xi et al. | |
| 9,287,837 | B2 * | 3/2016 | Lau | H03F 3/387 |
| 2007/0222509 | A1 * | 9/2007 | Yoshizawa | H03F 1/3211 330/51 |
| 2014/0340145 | A1 * | 11/2014 | Funato | H03F 3/393 330/9 |
| 2015/0207477 | A1 * | 7/2015 | Stanescu | H03F 3/45475 330/9 |
| 2015/0349630 | A1 * | 12/2015 | Peng | H02M 3/156 323/282 |

* cited by examiner

*Primary Examiner* — Timothy J Dole
*Assistant Examiner* — Shahzeb K Ahmad

(57) ABSTRACT

A control circuit for switching converter has a chopping amplifier, a sample-hold circuit, a first comparator, an oscillator and a logic circuit. The chopping amplifier generates an amplified error signal based on a reference signal and a feedback signal. The sample-hold circuit generates a sample-hold signal based on the amplified error signal. The first comparator generates a first logic signal based on a comparison result between the sample-hold signal and a current sensing signal representing a current flowing through a power switch in the switching converter. The oscillator generates a clock signal. The logic circuit generates a control signal based on the first logic signal and the clock signal, the control signal is used to control the power switch.

20 Claims, 8 Drawing Sheets

FIG. 1 *(Prior Art)*

CONTROL CIRCUIT WITH CHOPPING AMPLIFIER FOR SWITCHING CONVERTER

CROSS-REFERENCE TO RELATED APPLICATION(S)

This application claims priority to and the benefit of Chinese Patent Application No. 201410330826.4, filed on Jul. 11, 2014, which is incorporated herein by reference in its entirety.

TECHNICAL FIELD

The present invention generally relates to electronic apparatuses, and more particularly but not exclusively to control circuits with chopping amplifier for switching converter.

BACKGROUND

Switching converters are widely used due to their high efficiency and simple internal structure. FIG. 1 schematically illustrates a prior art switching converter 10. The switching converter 10 comprises a control circuit 100 and a switching circuit 110. The switching circuit 110 comprises at least a power switch M1. The power switch M1 has a first terminal, a second terminal and a control terminal. The switching circuit 110 converts an input voltage VIN to an output voltage VOUT according to a control signal CTRL. The switching circuit 110 may apply different types of topology, such as buck converter, boost converter, buck-boost converter, fly-back converter, and other switching converters.

The control circuit 100 comprises an error amplifier 101, a comparator 102, a logic circuit 103, a current sensing circuit 104 and an oscillator 105.

The error amplifier 101 has a first input terminal, a second input terminal and an output terminal. Based on a reference signal VREF received at the first input terminal and the output voltage VOUT received at the second input terminal, the error amplifier 101 is operable to generate an amplified error signal VEAO at the output terminal. In another embodiment, the error amplifier 101 generates the error signal VEAO based on the reference signal VREF and a feedback signal indicating a load current IOUT of the switching converter 10.

The comparator 102 has a first input terminal, a second input terminal and an output terminal. The comparator 102 generates a first logic signal VL1 at the output terminal based on a comparison result between the error signal VEAO received at the first input terminal and a current sensing signal RFLTI received at the second input terminal. The current sensing signal RFLTI could reflect a current flowing through the power switch M1 or the inductor L. In the illustrated embodiment in FIG. 1, the current sensing signal RFLTI is generated by a current sensing circuit 104 that is configured to detect the current flowing through the power switch M1.

The logic circuit 103 has a first input terminal, a second input terminal and an output terminal. The logic circuit 103 generates a switching signal CTRL at the output terminal based on the first logic signal VL1 received at the first input terminal and the second logic signal VL2 received at the second input terminal. In the illustrated embodiment in FIG. 1, the second logic signal VL2 is a clock signal provided by the oscillator 105.

DC-DC converter 10 could provide a stable output voltage since the error amplifier 101 regulates the output voltage VOUT to a value substantially equal to the value of the reference signal VREF. In some applications, the value of the reference signal VREF may be relatively low (e.g. 200 mV) while an offset voltage (OFFSET) of the error amplifier 101 could be dozens of mill volts (e.g. 50 mV). So, the error of the output voltage VOUT or load current IOUT may be up to 25%. In addition, the noise of the input transistor of the error amplifier 101 would be amplified and reflected on the output voltage VOUT or load current IOUT. Reducing the error of the output voltage caused by the offset voltage or noise of the error amplifier 101 becomes a big challenge.

SUMMARY

Embodiments of the present invention are directed to a control circuit for a switching converter with at least a power switch, comprising: a chopping amplifier having a first input terminal, a second input terminal, a control terminal and an output terminal, wherein the first input terminal is configured to receive a reference signal, and wherein the second input terminal is configured to receive a feedback signal representing an output voltage or a load current of the switching converter, and wherein the control terminal is configured to receive a chopping control signal, and wherein based on the reference signal and the feedback signal, the chopping amplifier is operable to generate an amplified error signal at the output terminal; a sample-hold circuit having an input terminal, an output terminal and a control terminal, wherein the input terminal is coupled to the output terminal of the chopping amplifier, and wherein the control terminal is configured to receive a sample-hold control signal, and wherein the sample-hold circuit generates a sample-hold signal at the output terminal; a first comparator having a first input terminal, a second input terminal and an output terminal, wherein the first input terminal is coupled to the output terminal of the sample-hold circuit, and wherein the second input terminal is configured to receive a current sensing signal representing a current flowing through the power switch, and wherein based on a comparison result between the sample-hold signal and the current sensing signal, the first comparator generates a first logic signal at the output terminal; an oscillator, generating a clock signal; and a logic circuit having a first input terminal, a second input terminal and an output terminal, wherein the first input terminal is configured to receive the first logic signal, and wherein the second input terminal is configured to receive the clock signal, and wherein based on the first logic signal and the clock signal, the logic circuit generates a switching signal at the output terminal, and wherein the switching signal is configured to control the power switch.

Furthermore, there has been provided, in accordance with an embodiment of the present invention, a control circuit for a switching converter with at least a power switch, comprising: a chopping amplifier having a first input terminal, a second input terminal, a control terminal and an output terminal, wherein the first input terminal is configured to receive a reference signal, and wherein the second input terminal is configured to receive a feedback signal representing an output voltage or a load current of the switching converter, and wherein the control terminal is configured to receive a chopping control signal, and wherein based on the reference signal and the feedback signal, the chopping amplifier is operable to generate an amplified error signal at the output terminal; a sample-hold circuit having an input terminal, an output terminal and a control terminal, wherein the input terminal is coupled to the output terminal of the chopping amplifier, and wherein the control terminal is configured to receive a sample-hold control signal, and wherein the sample-hold circuit generates a sample-hold signal at the output terminal; a first comparator having a first input terminal, a second input terminal and an output terminal, wherein the first input terminal is coupled to the output terminal of the sample-hold circuit, and wherein the second input terminal is configured to receive the feedback signal, and wherein based on a comparison result between the sample-hold signal and the feedback signal, the first comparator generates an ON signal at the output terminal; an OFF signal generating circuit, generating an OFF signal at the output terminal; and a logic circuit having a first input terminal, a second input terminal and an output terminal, wherein the first input terminal is configured to receive the ON signal, and wherein the second input terminal is configured to receive the OFF signal, and wherein based on the ON signal and the OFF signal, the logic circuit provides a switching signal at the output terminal, and wherein the switching signal is configured to control the power switch.

Furthermore, there has been provided, in accordance with an embodiment of the present invention, a control circuit for a switching converter with at least a power switch, comprising: a chopping amplifier having a first input terminal, a second input terminal, a control terminal and an output terminal, wherein the first input terminal is configured to receive a reference signal, and wherein the second input terminal is configured to receive a feedback signal representing an output voltage or a load current of the switching converter, and wherein the control terminal is configured to receive a chopping control signal, and wherein based on the reference signal and the feedback signal, the chopping amplifier is operable to generate an amplified error signal at the output terminal; a first comparator having a first input terminal, a second input terminal and an output terminal, wherein the first input terminal is coupled to the output terminal of the chopping amplifier, and wherein the second input terminal is configured to receive a current sensing signal representing a current flowing through the power switch, and wherein based on a comparison result between the amplified error signal and the current sensing signal, the first comparator generates a first logic signal at the output terminal; an oscillator, generating a clock signal; and a logic circuit having a first input terminal, a second input terminal and an output terminal, wherein the first input terminal is configured to receive the first logic signal, and wherein the second input terminal is configured to receive the clock signal, and wherein based on the first logic signal and the clock signal, the logic circuit generates a switching signal at the output terminal, and wherein the switching signal is configured to control the power switch, and wherein the frequency of the chopping control signal is N times of the frequency of the switching signal, and wherein N is an integer greater than 0.

BRIEF DESCRIPTION OF THE DRAWINGS

Non-limiting and non-exhaustive embodiments are described with reference to the following drawings. The drawings are only for illustration purpose. Usually, the drawings only show part of the devices of the embodiments. These drawings are not necessarily drawn to scale. The relative sizes of elements illustrated by the drawings may differ from the relative size depicted.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
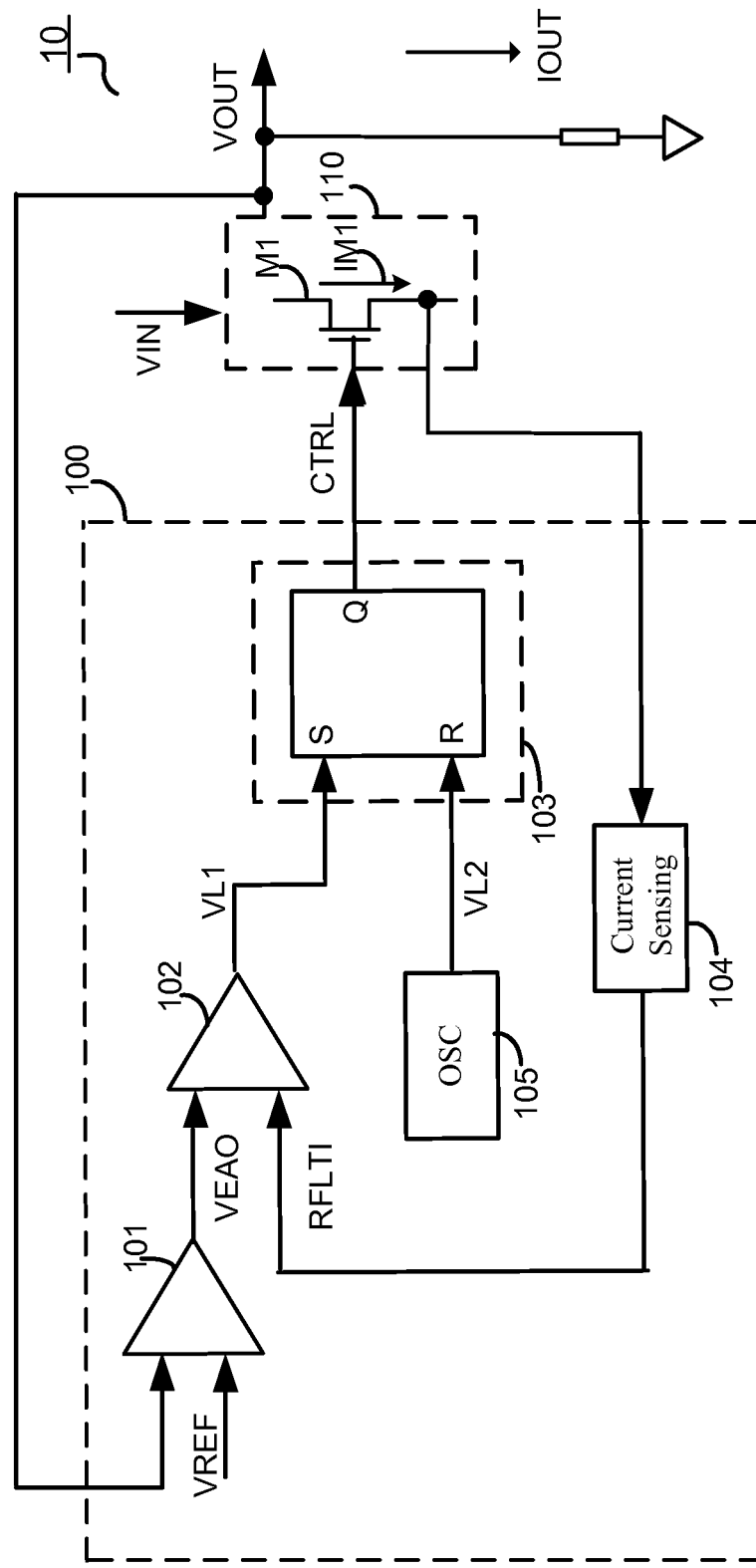
FIG. 1 schematically illustrates a prior art switching converter 10.
Figure 2:
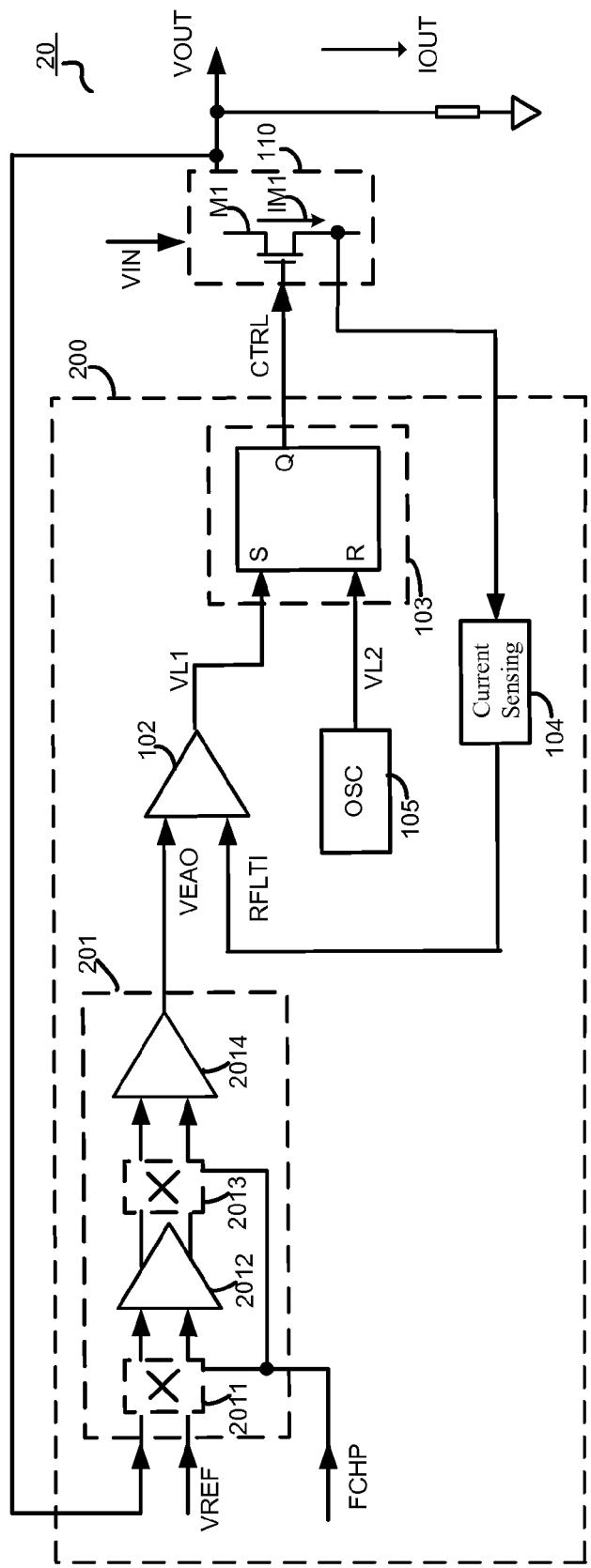
FIG. 2 schematically illustrates a switching converter 20 in accordance with an embodiment of the present invention.

FIG. 2 schematically illustrates a switching converter 20 in accordance with an embodiment of the present invention. The switching converter 20 comprises a control circuit 200 and a switching circuit 110. The control circuit 200 comprises a chopping amplifier 201, a comparator 102, a logic circuit 103, a current sensing circuit 104 and an oscillator 105.

The chopping amplifier 201 has a first input terminal, a second input terminal, a control terminal and an output terminal. Based on the reference signal VREF received at the first input terminal and the output voltage VOUT received at the second input terminal, the chopping amplifier 201 is operable to generate the error signal VEAO at the output terminal. As chopping technique is utilized, the chopping amplifier 201 comprises a first chopper 2011, an input stage 2012, a second chopper 2013 and an output stage 2014. The first chopper 2011 is configured to receive the reference signal VREF and the output voltage VOUT, the input stage 2012 is coupled between the first chopper 2011 and the second chopper 2013, the output stage 2014 is configured to generate the amplified error signal VEAO. A chopping control signal received on the control terminal of the chopping amplifier is used to control the first chopper 2011 and the second chopper 2013.

Figure 3:
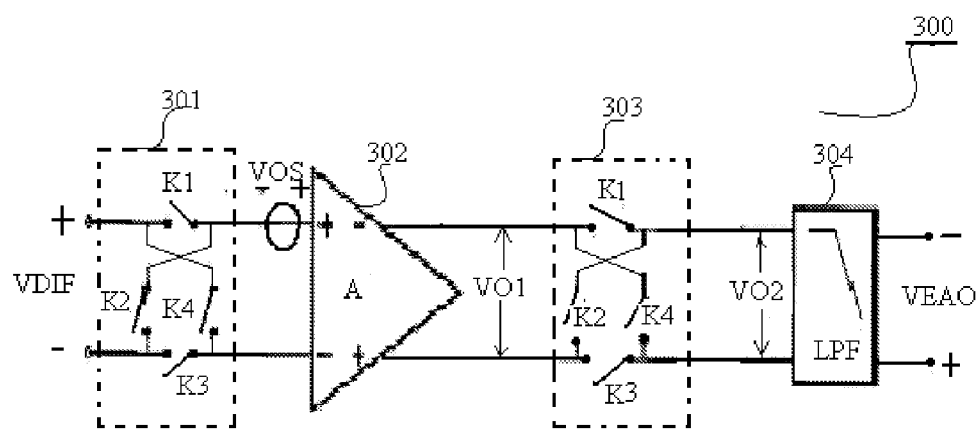
FIG. 3 schematically illustrates a chopping amplifier 300 in accordance with an embodiment of the present invention.

FIG. 3 schematically illustrates a chopping amplifier 300 in accordance with an embodiment of the present invention. The chopping amplifier 300 comprises a first chopper 301, an input stage 302, a second chopper 303 and an output stage 304. In the FIG. 3, a differential signal VDIF is used to express a difference between the reference signal VREF and the output voltage VOUT, wherein VOS is an offset voltage of the input stage 302, and wherein VO1 is an output voltage of the input stage 302, and further wherein VO2 is an output voltage of the second chopper 303. The output stage 304 could be regarded as a low pass filter to filter out the high frequency components of VO2. The output signal of the output stage 304 is configured to be the amplified error signal VEAO.

Referring to FIG. 3, the differential signal VDIF is modulated to a chopping frequency (up to several hundred kHz) by the first chopper 301, and then amplified by the input stage 302 and modulated back to the baseband by the second chopper 303. The offset voltage VOS is only modulated by the second chopper 303 and would be filter out by the output stage 304. It means that the offset voltage VOS could be nearly removed by the chopping amplifier 300.

Figure 4:
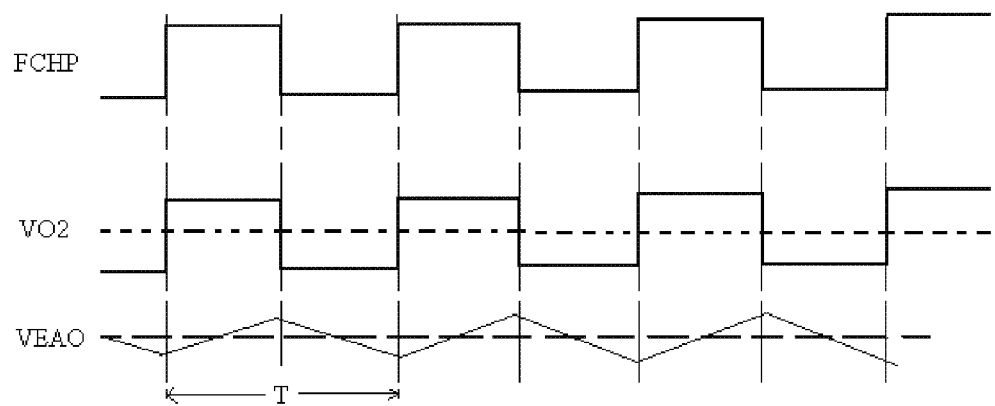
FIG. 4 illustrates operational waveforms of the chopping amplifier 300 in accordance with an embodiment of the present invention.

FIG. 4 illustrates operational waveforms of the chopping amplifier 300 in accordance with an embodiment of the present invention. Referring to FIG. 4, a chopping control signal FCHP with 50% duty cycle is used to control the first chopper 301 and the second chopper 303. In the first half cycle of the control single FCHP, switches K1 and K3 are turned on, and switches K2 and K4 are turned off. the output voltage VO1 and VO2 could be expressed as $$VO1 = A \times (VDIF + VOS)$$

$$VO2 = A \times (VDIF + VOS)$$

Wherein A is the amplification factor of the input stage 301. In the second half cycle of the control single FCHP, switches K2 and K4 are turned on, switches K1 and K3 are turned off, the output voltage VO1 and VO2 could be expressed as $$VO1 = A \times (VOS - VDIF)$$

$$VO2 = A \times (VDIF - VOS)$$

The average value of VO2 in one cycle could be expressed as $$VEAO = 0.5 \times A \times (VOS + VDIF) + 0.5 \times A \times (VDIF - VOS)$$
$$= A \times VDIF$$

The chopping techniques successfully reduce the error caused by the offset voltage VOS. Similarly, chopping technique also could successfully reduce noise caused by the noise of the input transistor of an amplifier.

In some embodiments, because of limitations of process, such as inability to provide a large resistor or capacitor, the output stage 2014 generally cannot provide a very low cutoff frequency. In some embodiments, an amplifier may be unable to provide a very low cut-off frequency due to the requirement of the loop stability of a switching converter. These limitations make the error signal VEAO be a varying triangular signal or a fluctuating signal. In some embodiments, the amplified error signal VEAO is configured to decide on-time or off-time of power switch M1. A varying signal may cause inconsistent on-time or off-time, leading to a varying duty cycle. For constant ON time (COT) or constant off time mode voltage converter, the variation of the error signal VEAO can also lead to a varying switching frequency.

Figure 5:
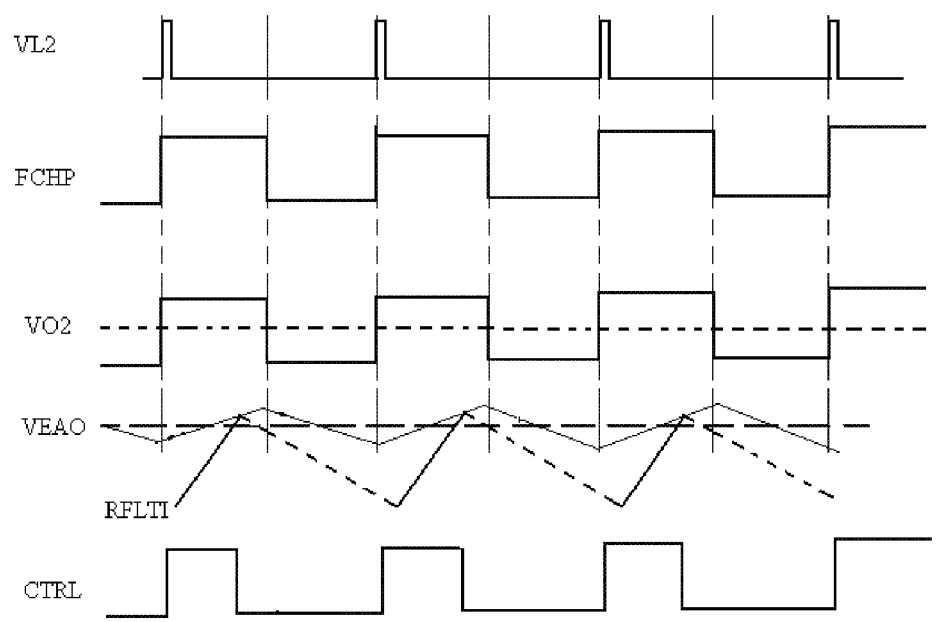
FIG. 5 illustrates operational waveforms of the switching converter 20 in accordance with an embodiment of the present invention.

One way to solve above issues is to set the frequency of the chopping control signal FCHP to be N times of the switching frequency of the converter 20, wherein N is an integer greater than 0. FIG. 5 illustrates an operational waveforms when the chopping frequency FCHP is substantial equal to the switching frequency of the switching converter 20 in accordance with an embodiment of the present invention. When the frequency of error amplifier signal VEAO and current feedback signal RFLTI are similar to each other, the current feedback signal RFLTI and the amplified error signal VEAO always "encounter" at the same voltage value, which makes the duty cycle of the switch signal CTRL consistent. However, since an optimal selection of the chopping control signal FCHP is a square wave signal with 50% duty cycle, a clock signal having a frequency of 2 times of the frequency of chopping control signal FCHP should be provided for frequency dividing. In some embodiments, an oscillator needs to provide a triangular wave having the same frequency as switching signal CTRL, which makes it unable to provide a clock signal having a frequency of 2 times of the frequency of switching signal CTRL. Also, in other embodiments, voltage converters may not have an oscillator.

Figure 6:
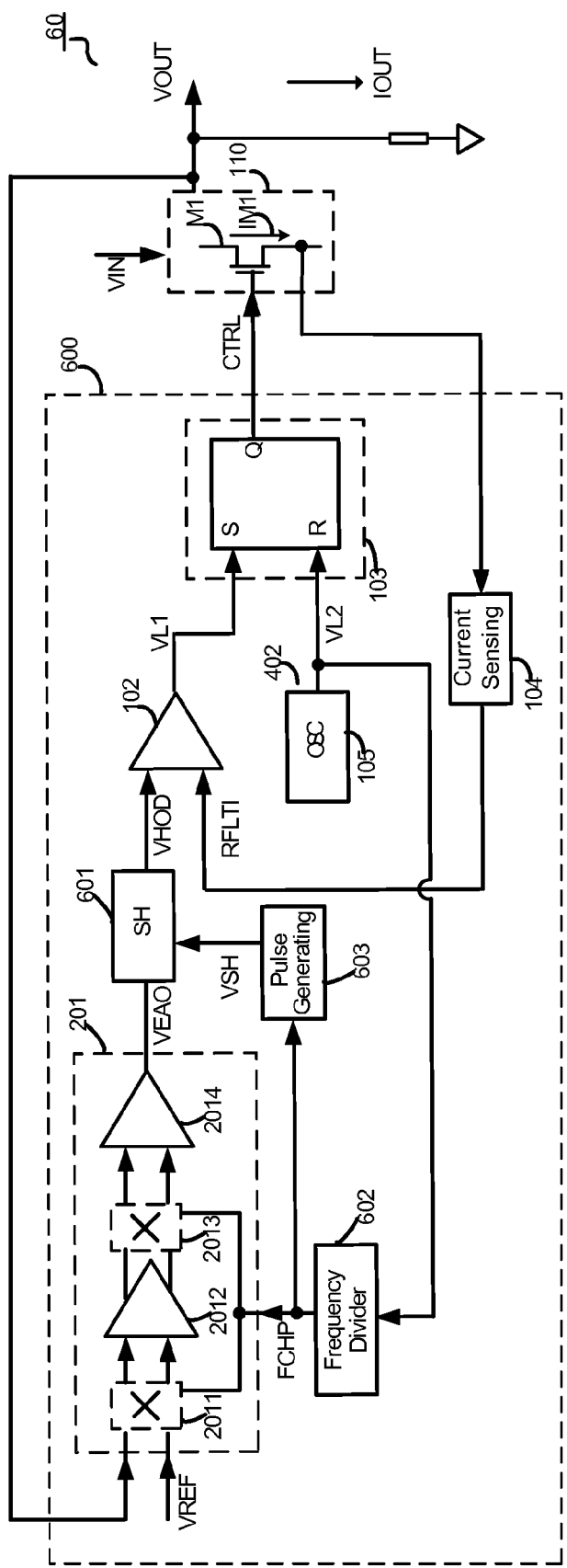
FIG. 6 schematically illustrates a switching converter 60 in accordance with an embodiment of the present invention.
Figure 7:
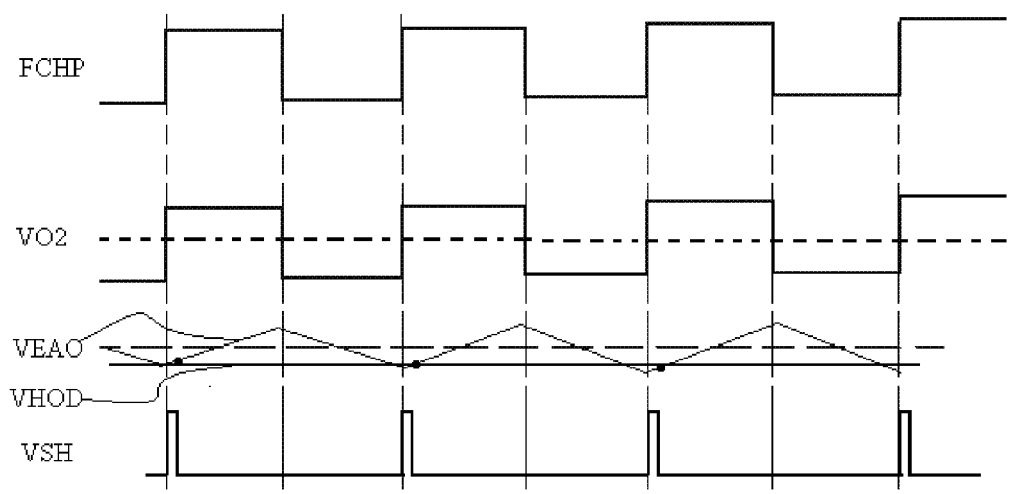
FIG. 7 illustrates operational waveforms of the switching converter 60 in accordance with an embodiment of the present invention.

To solve above issues, sample-hold technique could be used in an amplifier. FIG. 6 schematically illustrates a switching converter 60 in accordance with an embodiment of the present invention. The switching converter 60 comprises a control circuit 600 and a switching circuit 110. The control circuit 600 comprises the chopping amplifier 201, a sample-hold circuit 601, the comparator 102, the logic circuit 103, the current sensing circuit 104, the oscillator 105, a frequency divider 602 and a pulse generating circuit 603.

The sample-hold circuit 601 has an input terminal, an output terminal and a control terminal, wherein the input terminal is coupled to the output terminal of the chopping amplifier 201, and wherein the control terminal is configured to receive a sample-hold control signal VSH, and wherein the sample-hold circuit 601 generates a sample-hold signal VHOD at the output terminal. The sample-hold circuit 601 samples the amplified error signal VEAO and provides a signal at the output terminal as the sample-hold signal VHOD. The sample-hold circuit 601 refreshes the sample-hold signal VHOD when the sample-hold control signal VSH is enabled.

In one embodiment, the second logic signal VL2 can be used to obtain the chopping control signal FCHP. As shown in FIG. 6, control circuit 600 further comprises the frequency divider 602 having an input terminal and an output terminal, and wherein the input terminal is configured to receive the second logic signal VL2, and wherein the frequency divider 602 is configured to generate the chopping control signal FCHP. After frequency dividing, the period of the chopping control signal FCHP is usually several times of it of the second logic signal VL2, such as 2 times, 4 times or 6 times. In one embodiment, the chopping control signal FCHP could be served as the sample-hold control signal VSH directly. In another embodiment, the control circuit 600 further comprises the pulse generating circuit 603 having an input terminal and an output terminal, and wherein the input terminal is configured to receive the chopping control signal FCHP, and wherein the pulse generating circuit 603 is configured to generate the sample-hold control signal VSH having the same frequency as it of the chopping control signal FCHP.

In another embodiment, the input terminal of the frequency divider 602 could be couple to the output terminal of the logic circuit 103, configured to generate the chopping control signal FCHP based on the switching signal CTRL.

Figure 8:
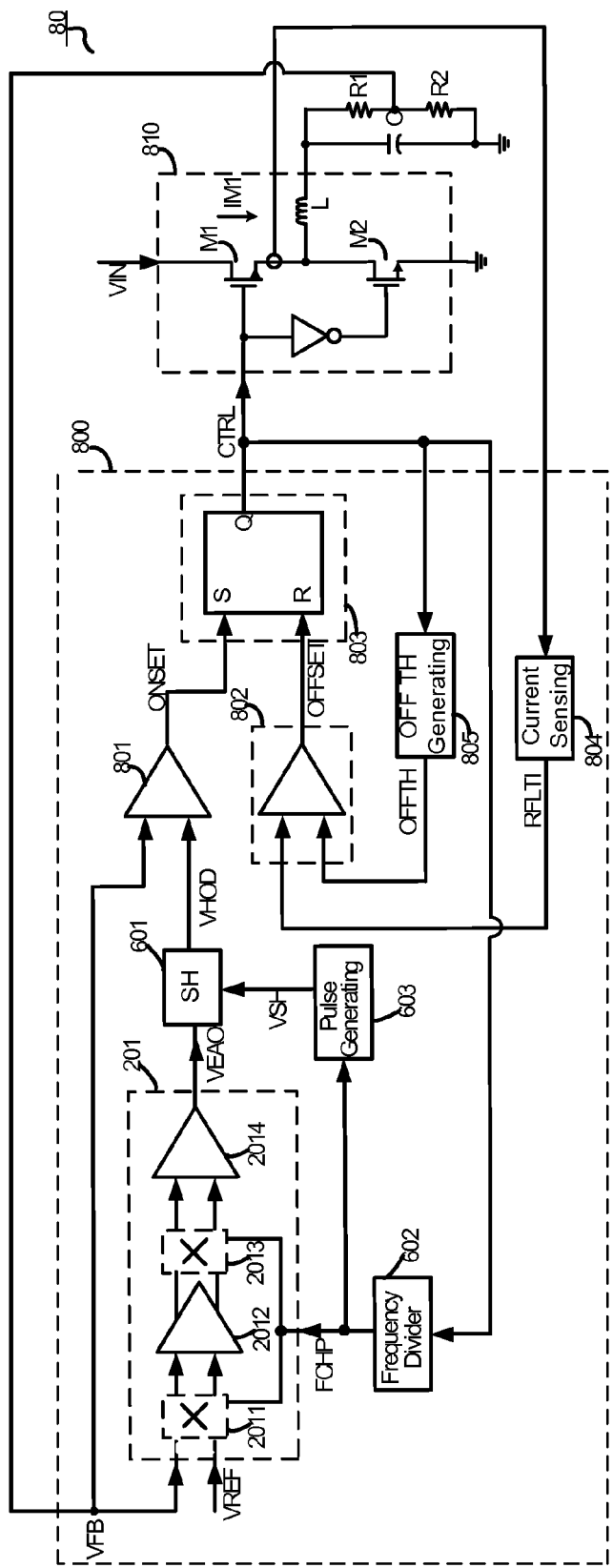
FIG. 8 schematically illustrates a switching converter 80 in accordance with an embodiment of the present invention.

FIG. 8 schematically illustrates a switching mode power converter 80 in accordance with an embodiment of the present invention. The switching mode power converter 80 comprises a control circuit 800 and a switching circuit 810. The switching circuit 810 adopts a synchronous buck topology, comprising a power switch M1, a low side switch M2, an inductor L and an output capacitor C. The power switch M1 has a first terminal configured to receive an input voltage VIN, a control terminal configured to receive the switching signal CTRL, and a second terminal. The low side switch has a first terminal coupled to the second terminal of the power switch M1, a control terminal and a second terminal connected to ground. The inductor L has a first terminal connected to the second terminal of the power switch M1 and a second terminal configured to provide the output voltage VOUT. The switching circuit 810 converts the input voltage VIN to the output voltage VOUT according to a control signal CTRL.

The control circuit 800 comprises the chopping amplifier 201, the sample-hold circuit 601, the frequency divider 602, the pulse generating circuit 603, a comparator 801, an OFF signal generating circuit 802, a logic circuit 803, a current sensing circuit 804 and an OFF threshold generating circuit 805.

The chopping amplifier 201 has a first input terminal, a second input terminal, a control terminal and an output terminal, wherein the first input terminal is configured to receive a reference signal VREF, and wherein the second input terminal is configured to receive a feedback signal VFB, and wherein the control terminal is configured to receive a chopping control signal FCHP, and wherein based on the reference signal and the feedback signal, the chopping amplifier is operable to generate the amplified error signal VEAO at the output terminal;

The sample-hold circuit 601 has an input terminal, an output terminal and a control terminal, wherein the input terminal is coupled to the output terminal of the chopping amplifier 201, and wherein the control terminal is configured to receive a sample-hold control signal VSH, and wherein the sample-hold circuit generates a sample-hold signal VHOD at the output terminal.

The comparator 801 has a first input terminal, a second input terminal and an output terminal. Based on a comparison result between the sample-hold signal VHOD received at the first input terminal and the feedback voltage VFB received at the second input terminal, the comparator 801 provides the ON signal ONSET at the output terminal. In the embodiment shown in FIG. 8, a first resister RF1 and a second resister RF2 are connected in series to sense the output voltage VOUT and provide the feedback voltage VFB. In another embodiment, the feedback voltage VFB may express a load current of the switching converter 80.

The OFF signal generating circuit 802 provides an OFF signal OFFSET at the output terminal. In one embodiment, the OFF signal OFFSET could be a clock signal with a constant pulse width. In another embodiment, the OFF signal generating circuit 802 has a first input terminal, a second input terminal and an output terminal, based on a comparison result between a reference voltage signal received at the first input terminal and a triangular wave signal received at the second input terminal, the OFF signal generating circuit 102 provides the OFF signal OFFSET. In one embodiment, the OFF signal generating circuit 802 comprises a second comparator COM2. The second comparator COM2 has a first input terminal, a second input terminal and an output terminal. The second comparator COM2 provides the OFF signal OFFSET at the output terminal based on a comparison result between an OFF threshold signal OFFTH provided by the current seeing circuit 804 and a current sensing signal RFLTI provided by the OFF threshold generating circuit 805.

The logic circuit 803 has a first input terminal, a second input terminal and an output terminal. The logic circuit 803 provides a switching signal CTRL at the output terminal based on the ON signal ONSET received at the first input terminal and the OFF signal OFFSET received at the second input terminal. In an embodiment, the logic circuit 803 is a RS flip-flop.

The current sensing circuit 804 has an input terminal and an output terminal. The current sensing circuit 804 provides the current sensing signal RFLTI based on a current flowing through the power switch M1. In one embodiment, the current sensing circuit 104 is configured to detect the current flowing through the power switch M1 directly. In another embodiment, the current sensing circuit 804 comprises a current simulating circuit configured to simulate the current flowing through the power switch M1 by detecting the voltage on the second terminal of the power switch M1 or the voltage difference between the first terminal and the second terminal of the power switch M1.

The OFF threshold generating circuit 805 has an input terminal and an output terminal. The OFF threshold generating circuit 805 provides the OFF threshold signal OFFTH based on the difference between a frequency of the switching signal CTRL and a preset frequency FQREF, so as to make the frequency of the switching signal CTRL substantially equal to the preset frequency FQREF. In one embodiment, The OFF threshold generating circuit 805 comprises a phase lock (PLL) circuit. The PLL circuit is configured to receive a reference clock signal CLK and the switching signal CTRL, and provides the OFF threshold signal OFFTH based on the frequency difference between the reference clock signal CLK and the switching signal CTRL.

Figure 9:
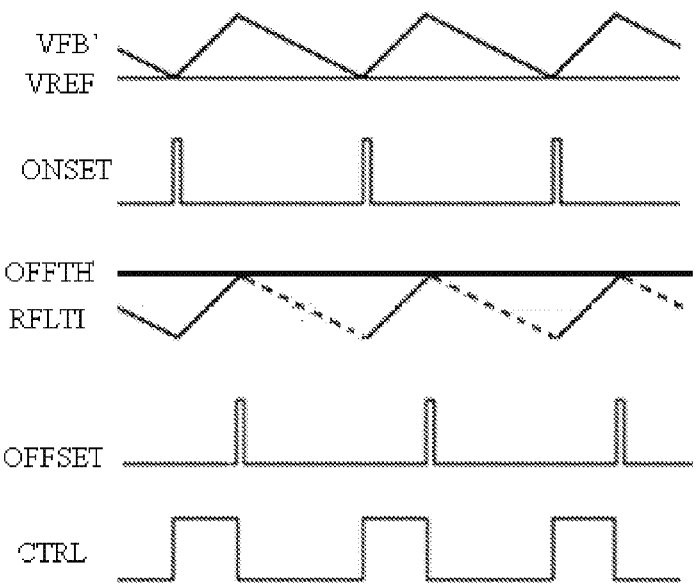
FIG. 9 illustrates operational waveforms of the switching converter 80 in accordance with an embodiment of the present invention.

FIG. 9 illustrates operational waveforms of the switching converter 80 in accordance with an embodiment of the present invention. When the feedback voltage VFB becomes is smaller than the reference signal VREF, the ON signal ONSET jumps from logic low to logic high, the switching signal CTRL is turned to logical high to turn on the power switch M1. The current sensing signal RFLTI and the current flowing through the power switch M1 (IM1) are increased since the power switch M1 is turned on. When the current sensing signal RFLTI reaches the OFF threshold OFFTH provided by the OFF threshold generating circuit 805, the switching signal CTRL is turned to logical low, and the power switch M1 is turned off. The OFF threshold generating circuit 805 adjusts the OFF threshold signal OFFTH based on the difference between a frequency of the switching signal CTRL and a preset frequency FQREF, so as to make the frequency of the switching signal CTRL substantially equal to the preset frequency FQREF. In one embodiment, when the power switch M1 is tuned off, the current sensing signal RFLTI could fall slowly as dashed line in FIG. 9. In another embodiment, when the power switch M1 is tuned off, the current sensing signal RFLTI could fall to a low value sharply.

Figure 10:
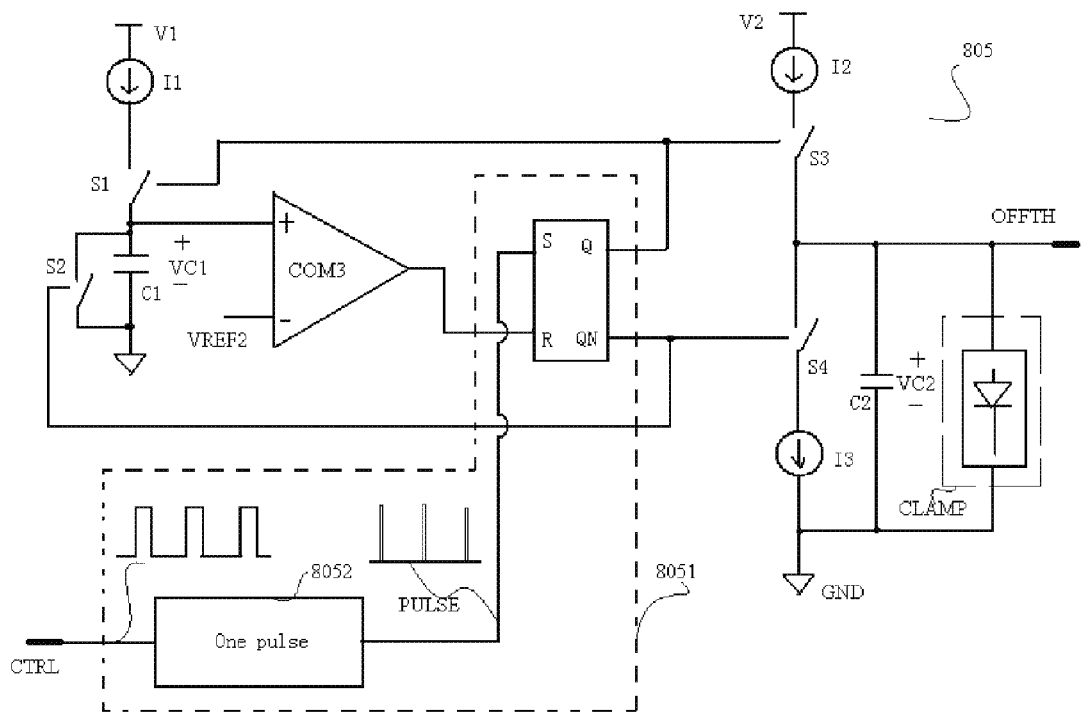
FIG. 10 schematically illustrates an OFF threshold generating circuit 805 in accordance with an embodiment of the present invention.

FIG. 10 schematically illustrates the OFF threshold generating circuit 805 in accordance with an embodiment of the present invention. The OFF threshold generating circuit 805 comprises a first current source I1, a second current source I2, a third current source I3, a first capacitor C1, a second capacitor C2, a first switch S1, a second switch S2, a third switch S3, a fourth switch S4, a third comparator COM3 and a second logic circuit 8051.

The first capacitor C1 has a first terminal and a second terminal, wherein the second terminal is connected to ground. The first switch S1 has a first terminal, a second terminal and a control terminal, wherein the first terminal is coupled to a first voltage V1 via the first current source I1, and wherein the second terminal is coupled to the first terminal of the first capacitor C1. The second switch S2 has a first terminal, a second terminal and a control terminal, wherein the first terminal is coupled to the first terminal of the first capacitor C1, and wherein the second terminal is connected to ground. The second capacitor C2 has a first terminal and a second terminal, wherein the second terminal is connected to ground. The third switch S3 has a first terminal, a second terminal and a control terminal, wherein the first terminal receives a second voltage V2 via the second current source I2, and wherein the second terminal is coupled to the first terminal of the second capacitor C2. The fourth switch S4 has a first terminal, a second terminal and a control terminal, wherein the first terminal is coupled to the first terminal of the first capacitor C1, and wherein the second terminal is coupled to ground via third current source I3. The third comparator COM3 has a first input terminal, a second input terminal and an output terminal, and wherein the first input terminal is coupled to the first terminal of the first capacitor C1, and wherein the second input terminal is configured to receive a second reference signal VREF2. The second logic circuit 8051 has a first input terminal, a second input terminal, a first output terminal and a second output terminal, wherein the first input terminal is coupled to the output of the third comparator COM3, and wherein the second input terminal is configured to receive the switching signal CTRL, and wherein the second logic circuit is configured to provide a plurality of control signals to control the first switch S1, the second switch S2, the third switch S3 and the fourth switch S4.

In one embodiment, the second logic circuit 8051 comprises a RS flip-flop having a first input terminal R, a second input terminal S and an output terminal O. In another embodiment, the second logic circuit 8051 further comprises a pulse generating circuit 8052 having an input terminal and an output terminal. The pulse generating circuit 8052 is configured to generate a pulse signal PULSE having same frequency as the switching signal CTRL.

In some embodiments, the OFF threshold generating circuit 805 further comprises a clamping circuit CLAMP. The clamping circuit CLAMP is configured to set a maximum value of the VC2 to a clamped voltage VCLAP. When the switching converter 80 in a light load, the OFF threshold signal OFFTH is smaller than the maximum value and the frequency of the switching signal CTRL is equal to the preset frequency FQREF. When the switching converter 80 in a heavy load, the OFF threshold signal OFFTH is clamped to the maximum value by the clamping circuit CLAMP and the frequency of the switching signal CTRL is larger than the preset frequency FQREF Control circuits with chopping amplifier for switching converter have been disclosed. While specific embodiments of the present invention have been provided in the above description, it should be understood that these embodiments are for illustration purposes and not intend to limit the present invention. Many additional embodiments will be apparent to persons of ordinary skill in the art under the spirit of the present invention.

I claim:

1. A control circuit for a switching converter with at least a power switch, comprising:
    a chopping amplifier having a first input terminal, a second input terminal, a control terminal and an output terminal, wherein the first input terminal is configured to receive a reference signal, and wherein the second input terminal is configured to receive a feedback signal representing an output voltage or a load current of the switching converter, and wherein the control terminal is configured to receive a chopping control signal, and wherein based on the reference signal and the feedback signal, the chopping amplifier is operable to generate an amplified error signal at the output terminal;
    a sample-hold circuit having an input terminal, an output terminal and a control terminal, wherein the input terminal is coupled to the output terminal of the chopping amplifier, and wherein the control terminal is configured to receive a sample-hold control signal, and wherein the sample-hold circuit generates a sample-hold signal at the output terminal;
    a first comparator having a first input terminal, a second input terminal and an output terminal, wherein the first input terminal is coupled to the output terminal of the sample-hold circuit, and wherein the second input terminal is configured to receive a current sensing signal representing a current flowing through the power switch, and wherein based on a comparison result between the sample-hold signal and the current sensing signal, the first comparator generates a first logic signal at the output terminal;
    an oscillator, generating a clock signal; and
    a logic circuit having a first input terminal, a second input terminal and an output terminal, wherein the first input terminal is configured to receive the first logic signal, and wherein the second input terminal is configured to receive the clock signal, and wherein based on the first logic signal and the clock signal, the logic circuit generates a switching signal at the output terminal, and wherein the switching signal is configured to control the power switch.

2. The control circuit according to claim 1, wherein the switching converter is configured in a BUCK converter.

3. The control circuit according to claim 1, wherein the chopping amplifier comprises a first chopper, an input stage, a second chopper and an output stage, and wherein the first chopper, the input stage, the second chopper and the output stage are serially coupled in sequence, and wherein the chopping control signal is configured to control both the first chopper and the second chopper.

4. The control circuit according to claim 1, wherein the control circuit further comprises a frequency divider having an input terminal and an output terminal, and wherein the input terminal is configured to receive the clock signal or the switching signal, and wherein the frequency divider is configured to generate the chopping control signal.

5. The control circuit according to claim 4, wherein the control circuit further comprise a pulse generating circuit having an input terminal and an output terminal, and wherein the input terminal is configured to receive the chopping control signal, and wherein the pulse generating circuit is configured to generate the sample-hold control signal having substantially the same frequency as the frequency of the chopping control signal.

6. The control circuit according to claim 1, wherein the frequency of the chopping control signal is N times of the frequency of the sample-hold control signal, and wherein N is an integer greater than 0.

7. A control circuit for a switching converter with at least a power switch, comprising:
    a chopping amplifier having a first input terminal, a second input terminal, a control terminal and an output terminal, wherein the first input terminal is configured to receive a reference signal, and wherein the second input terminal is configured to receive a feedback signal representing an output voltage or a load current of the switching converter, and wherein the control terminal is configured to receive a chopping control signal, and wherein based on the reference signal and the feedback signal, the chopping amplifier is operable to generate an amplified error signal at the output terminal;

a sample-hold circuit having an input terminal, an output terminal and a control terminal, wherein the input terminal is coupled to the output terminal of the chopping amplifier, and wherein the control terminal is configured to receive a sample-hold control signal, and wherein the sample-hold circuit generates a sample-hold signal at the output terminal;

a first comparator having a first input terminal, a second input terminal and an output terminal, wherein the first input terminal is coupled to the output terminal of the sample-hold circuit, and wherein the second input terminal is configured to receive the feedback signal, and wherein based on a comparison result between the sample-hold signal and the feedback signal, the first comparator generates an ON signal at the output terminal;

an OFF signal generating circuit, generating an OFF signal at the output terminal; and a logic circuit having a first input terminal, a second input terminal and an output terminal, wherein the first input terminal is configured to receive the ON signal, and wherein the second input terminal is configured to receive the OFF signal, and wherein based on the ON signal and the OFF signal, the logic circuit provides a switching signal at the output terminal, and wherein the switching signal is configured to control the power switch.

8. The control circuit according to claim 7, wherein the switching converter is configured in a BUCK converter.

9. The control circuit according to claim 7, wherein
the OFF signal decides an on time of the converter circuit, wherein during the on time, the power switch is ON; and
the ON signal decides an off time of the converter circuit, wherein during the off time, the power switch is OFF.

10. The control circuit according to claim 7, wherein the chopping amplifier comprises a first chopper, an input stage, a second chopper and an output stage, and wherein the first chopper, the input stage, the second chopper and the output stage are serially coupled in sequence, and wherein the chopping control signal is configured to control both the first chopper and the second chopper.

11. The control circuit according to claim 7, wherein the control circuit further comprises a frequency divider having an input terminal and an output terminal, and wherein the input terminal is configured to receive the OFF signal or the switching signal, and wherein the frequency divider is configured to generate the chopping control signal.

12. The control circuit according to claim 11, wherein the control circuit further comprise a pulse generating circuit having an input terminal and an output terminal, and wherein the input terminal is configured to receive the chopping control signal, and wherein the pulse generating circuit is configured to generate the sample-hold control signal having substantially the same frequency as the frequency of the chopping control signal.

13. The control circuit according to claim 7, wherein the frequency of the chopping control signal is N times of the frequency of the sample-hold control signal, and wherein N is an integer greater than 0.

14. The control circuit according to claim 7, wherein the control circuit further comprise:

a current sensing circuit having an input terminal and an output terminal, wherein based on a current flowing through the power switch, the current sensing circuit provides a current sensing signal;

the OFF signal generating circuit having a first input terminal, a second input terminal and an output terminal, wherein the first input terminal is configured to receive an OFF threshold signal, and wherein the second input terminal is configured to receive the current sensing signal, and wherein based on a comparison result between the OFF threshold signal and the current sensing signal, the OFF signal generating circuit provides the OFF signal at the output terminal; and an OFF threshold generating circuit having an input terminal and an output terminal, wherein the input terminal is configured to receive the switching signal, and wherein the output terminal is configured to provide the OFF threshold signal, and wherein the OFF threshold generating circuit adjusts the OFF threshold signal based on a difference between a frequency of the switching signal and a preset frequency, so as to make the frequency of the switching signal substantially equal or larger than the preset frequency.

15. The control circuit according to claim 7, wherein the OFF threshold generating circuit comprises:

a first capacitor having a first terminal and a second terminal, wherein the second terminal is connected to ground;

a first current source;

a first switch having a first terminal, a second terminal and a control terminal, wherein the first terminal receives a first voltage via the first current source, and wherein the second terminal is coupled to the first terminal of the first capacitor;

a second switch having a first terminal, a second terminal and a control terminal, wherein the first terminal is coupled to the first terminal of the first capacitor, and wherein the second terminal is connected to ground;

a second capacitor having a first terminal and a second terminal, wherein the second terminal is connected to ground;

a second current source, having a positive terminal and a negative terminal, wherein the positive terminal receives a second voltage;

a third switch having a first terminal, a second terminal and a control terminal, wherein the first terminal is coupled to the negative terminal of the second current source, and wherein the second terminal is coupled to the first terminal of the second capacitor;

a third current source;

a fourth switch having a first terminal, a second terminal and a control terminal, wherein the first terminal is coupled to the first terminal of the first capacitor, and wherein the second terminal is coupled to ground via the third current source;

a third comparator having a first input terminal, a second input terminal and an output terminal, and wherein the first input terminal is coupled to the first terminal of the first capacitor, and wherein the second input terminal is configured to receive a second reference signal; and a second logic circuit having a first input terminal, a second input terminal, a first output terminal and a second output terminal, wherein the first input terminal is coupled to the output terminal of the third comparator, and wherein the second input terminal is configured to receive the switching signal, and wherein the second logic circuit is configured to provide a plurality of control signals to control the first switch, the second switch, the third switch and the fourth switch.

16. The control circuit according to claim 15, wherein the second logic circuit further comprise a pulse generating circuit, and wherein the pulse generating circuit is configured to generate a pulse signal having substantially the same frequency as the frequency of the switching signal.

17. The control circuit of claim 15, wherein the second logic circuit is configured to provide a first control signal and a second control signal, and wherein the first control signal is configured to control the first switch and the third switch, and wherein the second control signal is configured to control the second switch and the fourth switch.

18. The control circuit according claim 15, wherein the OFF threshold generating circuit further comprises a clamping circuit configured to set a maximum value for the OFF threshold signal.

19. The control circuit according to claim 18, wherein the frequency of the switching signal is equal to the preset frequency if the OFF threshold signal is smaller than the maximum value; and wherein the frequency of the switching signal is larger than the preset frequency if the OFF threshold signal is clamped to the maximum value by the clamping circuit.

20. A control circuit for a switching converter with at least a power switch, comprising:
   a chopping amplifier having a first input terminal, a second input terminal, a control terminal and an output terminal, wherein the first input terminal is configured to receive a reference signal, and wherein the second input terminal is configured to receive a feedback signal representing an output voltage or a load current of the switching converter, and wherein the control terminal is configured to receive a chopping control signal, and wherein based on the reference signal and the feedback signal, the chopping amplifier is operable to generate an amplified error signal at the output terminal;
   a first comparator having a first input terminal, a second input terminal and an output terminal, wherein the first input terminal is coupled to the output terminal of the chopping amplifier, and wherein the second input terminal is configured to receive a current sensing signal representing a current flowing through the power switch, and wherein based on a comparison result between the amplified error signal and the current sensing signal, the first comparator generates a first logic signal at the output terminal;
   an oscillator, generating a clock signal; and
   a logic circuit having a first input terminal, a second input terminal and an output terminal, wherein the first input terminal is configured to receive the first logic signal, and wherein the second input terminal is configured to receive the clock signal, and wherein based on the first logic signal and the clock signal, the logic circuit generates a switching signal at the output terminal, and wherein the switching signal is configured to control the power switch, and wherein the frequency of the chopping control signal is N times of the frequency of the switching signal, and wherein N is an integer greater than 0.

* * * * *